US006878222B1

(12) United States Patent
Os

(10) Patent No.: US 6,878,222 B1
(45) Date of Patent: Apr. 12, 2005

(54) APPARATUS AND METHOD FOR APPLYING INDICIA TO PACKAGES ENCLOSED WITHIN A CONTAINER

(75) Inventor: Arlen Van Os, Jenison, MI (US)

(73) Assignee: Van Os Enterprises, Jenison, MI (US)

( * ) Notice: Subject to any disclaimer, the term of this patent is extended or adjusted under 35 U.S.C. 154(b) by 141 days.

(21) Appl. No.: 09/905,024

(22) Filed: Jul. 13, 2001

(51) Int. Cl.[7] ................................................ B32B 31/20

(52) U.S. Cl. ......................... 156/64; 156/356; 156/357; 156/362; 156/363

(58) Field of Search .......................... 156/64, 356, 357, 156/DIG. 1, DIG. 2, DIG. 4, 362, 363; 53/58; 131/283

(56) References Cited

U.S. PATENT DOCUMENTS

| | | | | |
|---|---|---|---|---|
| 3,477,198 A | | 11/1969 | Davis | |
| 3,513,616 A | | 5/1970 | Davis | |
| 3,584,432 A | | 6/1971 | Mayer, Jr. | |
| 3,765,145 A | | 10/1973 | Davis | |
| 3,902,406 A | * | 9/1975 | Reichert | 493/132 |
| 4,084,501 A | | 4/1978 | Kerwin et al. | |
| 4,101,362 A | * | 7/1978 | Baker et al. | 156/235 |
| 4,263,766 A | | 4/1981 | Baker et al. | |
| 4,265,355 A | | 5/1981 | Davis | |
| 4,462,851 A | | 7/1984 | Colgate, Jr. | |
| 4,648,933 A | | 3/1987 | Graziano | |
| 4,655,871 A | * | 4/1987 | Mattei et al. | 156/484 |
| 4,657,622 A | | 4/1987 | Paules | |
| 4,664,740 A | | 5/1987 | Wilkinson | |
| 4,762,587 A | | 8/1988 | Deal | |
| 4,969,305 A | * | 11/1990 | York et al. | 53/136.1 |
| 5,019,029 A | | 5/1991 | Calvert | |
| 5,168,883 A | | 12/1992 | Winn | |
| 5,408,927 A | | 4/1995 | Gallagher et al. | |
| 5,440,852 A | * | 8/1995 | Lam | 53/377.2 |
| 5,582,663 A | * | 12/1996 | Matsunaga | 118/688 |
| 5,794,417 A | | 8/1998 | Mohrman | |

* cited by examiner

*Primary Examiner*—Chris Fiorilla
*Assistant Examiner*—George Koch
(74) *Attorney, Agent, or Firm*—Young & Basile, P.C.

(57) ABSTRACT

An apparatus is capable of simultaneously stamping indicia on each of a plurality of packages positioned within a larger container. The apparatus is programmable to process packages and containers of different sizes by adjusting the position of a transport conveyor with respect to the operable elements of the apparatus. The apparatus can include a loading station, an opening station, a stamping station, a closing station, and an unloading station. A programmable control system is provided for responding to one or more sensors in accordance to a control program stored in memory. The one or more sensors can include sensors to determine if a container is present at one or more locations, and one or more temperature sensors.

30 Claims, 3 Drawing Sheets

APPARATUS AND METHOD FOR APPLYING INDICIA TO PACKAGES ENCLOSED WITHIN A CONTAINER

FIELD OF THE INVENTION

The present invention relates to an apparatus for applying or stamping indicia on individual packages or packs held within a larger container or carton, and more particularly to the application of a tax stamp to one end of a cigarette pack of any size while positioned within a larger carton holding a plurality of cigarette packs.

BACKGROUND OF THE INVENTION

Various tax stamping machines have been proposed in the past for providing a process of applying stamps to one end of a cigarette pack. However, each of these machines has been designed for a particular size of a cigarette pack, and can not be readily adapted or modified to handle cigarette packs of a different size. Therefore, it has been standard practice to manually hand stamp cigarette packs that are larger than the standard size pack. This is a very inefficient, costly and time consuming operation.

SUMMARY OF THE INVENTION

It would be desirable in the present invention to provide an automated apparatus capable of being readily adjusted for different size cigarette packs and cartons to allow for automated processing of the stamping operation for cigarettes of any size. It would be desirable to increase the efficiency of the stamping operation to provide a production rate on the order of 90 cartons per minute. It would be desirable in the present invention to provide an apparatus that was capable of operating on demand for production when the product to be stamped was present on a loading conveyor. It would be desirable in the present invention to provide an apparatus capable of detecting product jams along the transport path and automatically stopping further processing operations to eliminate damage or waste of tax stamps being improperly applied. It would be desirable in the present invention to provide an apparatus capable of automatically monitoring the operational temperature of the stamping head to prevent unsatisfactory operation due to temperatures being lower than desired, or temperatures being higher than desired. It would be desirable in the present invention to provide an apparatus with a temperature sensor for monitoring the temperature of hot glue to be applied to an open flap of the carton prior to resealing the carton after stamping. It would be desirable in the present invention to control operation of the apparatus to prevent processing of cartons or packages if the temperature range of one or more sensors is above or below the desired temperature range. It would be desirable in the present invention to provide an unloading mechanism with a sensor capable of stopping operation of the apparatus when the unloading mechanism is full. It would be desirable in the present invention to provide an apparatus capable of easy adjustment for different size cigarettes, including cigarettes of different lengths and widths. By way of example and not limitation, the apparatus should be capable of processing cigarette sizes corresponding to regular, king, 120's, slims, ultra long or the like. It would be desirable to provide a stamping apparatus having a computerized control system for monitoring processing and capable of being preprogrammed for different size packages to be stamped.

An apparatus for stamping a plurality of packages or packs positioned within a larger container or carton according to the present invention can include a loader mechanism for sensing the presence of a container or carton at a ready position and a pusher for moving the container or carton from the ready position. A transport conveyor receives the container or carton from the loader mechanism for movement along a predetermined transport path in a length wise orientation with respect to a longitudinal axis of the elongate container or carton in an upright or upside down orientation depending on which end of the packages or packs are to receive the stamp to be applied thereon. The transport path passes each container or carton through an opening station where an upper end of the container or carton is automatically opened as the container or carton continues to travel along the transport path. A sensor is positioned in proximity to the opening station to monitor whether a jam of the product in the transport conveyor occurs, and to send a corresponding signal if a jam is detected in order to cease further processing operations of the apparatus. The opened carton is then transported along the transport path to a stamping station. Sensors in proximity to the stamping station determine whether the flaps of the container or carton are in the opened position to expose one end of the plurality of packages or packs positioned within the larger container or carton. If the flaps are not open, a signal is sent to the control system indicating that the carton is not properly prepared for stamping and further processing is halted for operator intervention to correct the error. If both flaps of the container or carton are in the open position, the carton is stopped at an appropriate position along the transport path below the stamping head. The stamping head is reciprocated to engage a carrier sheet supporting a plurality of stamps, such as tax stamp indicia, and to drive the stamps simultaneously into engagement with the plurality of packages or packs positioned within the container or carton. A single reciprocal stroke applies a stamp to each of the packs within the carton. A temperature sensor continuously monitors the temperature of the stamp head to automatically cease operation of the apparatus in the event that the temperature falls below a predetermined value, or rises above a predetermined value. The carton containing the stamped packs then continues to move along the transport path through a closing station, where hot glue is applied to one of the flaps, and the flaps are folded over one another and pressed together to reseal the container or carton. A temperature sensor continuously monitors the temperature of the hot glue to be applied to the open flap. The temperature sensor is capable of sending an appropriate signal to the control system if the temperature of the glue falls below a predetermined temperature, or rises above a predetermined temperature. After resealing or closing of the container or carton, the transport conveyor discharges the resealed container to an unloader mechanism. The unloader mechanism accumulates resealed containers for repackaging into shipment boxes. The unloader mechanism preferably includes a sensor for monitoring whether the unloader mechanism is full of resealed containers. If the unloader mechanism becomes full of resealed containers or cartons, an appropriate signal is sent to the control system in order to cease further operation of the apparatus until the unloader mechanism has been cleared or the full signal condition no longer exists.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
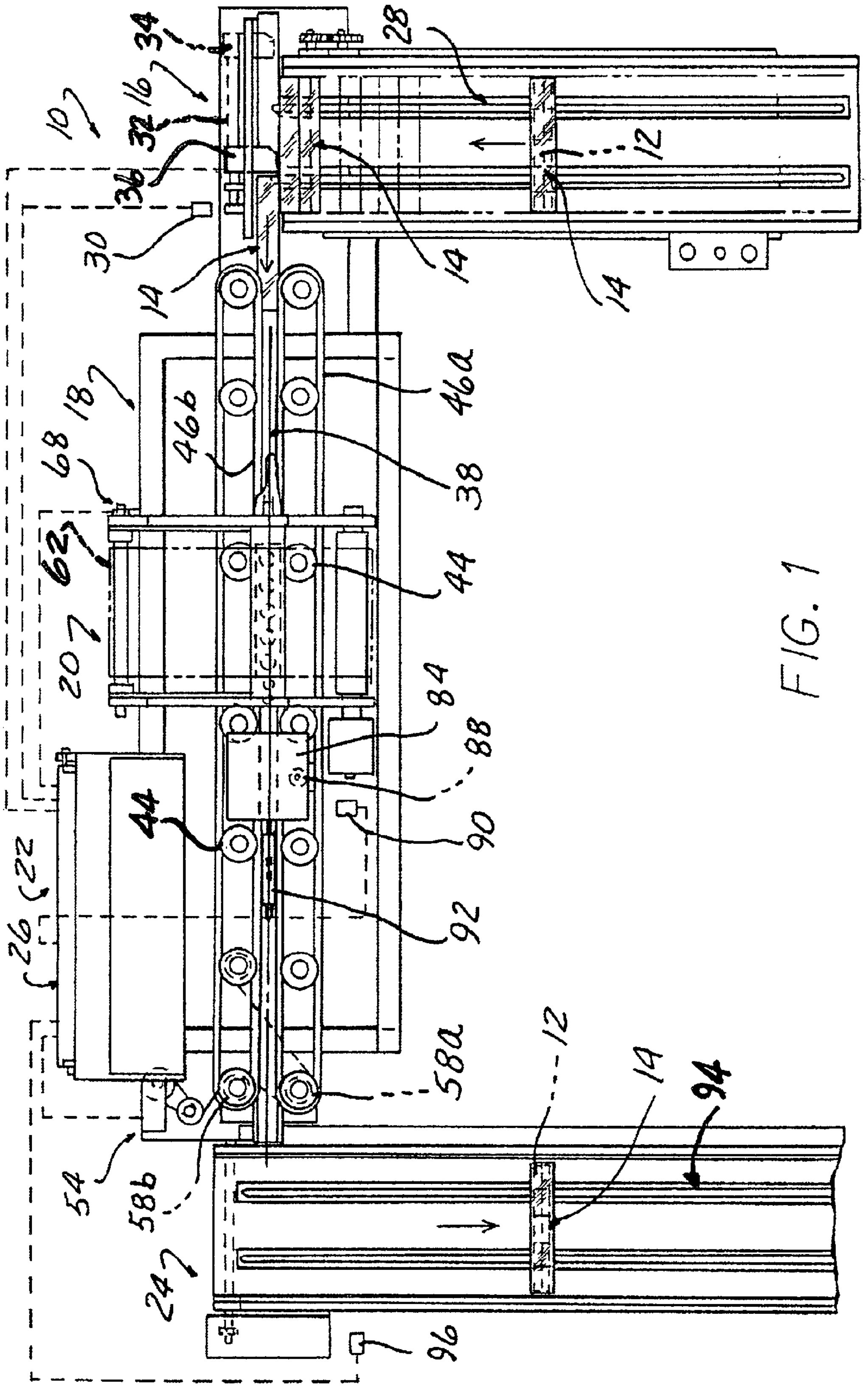
FIG. 1 is a plan view of an apparatus for stamping indicia on a plurality of packages positioned within a larger container according to the present invention.
Figure 2:
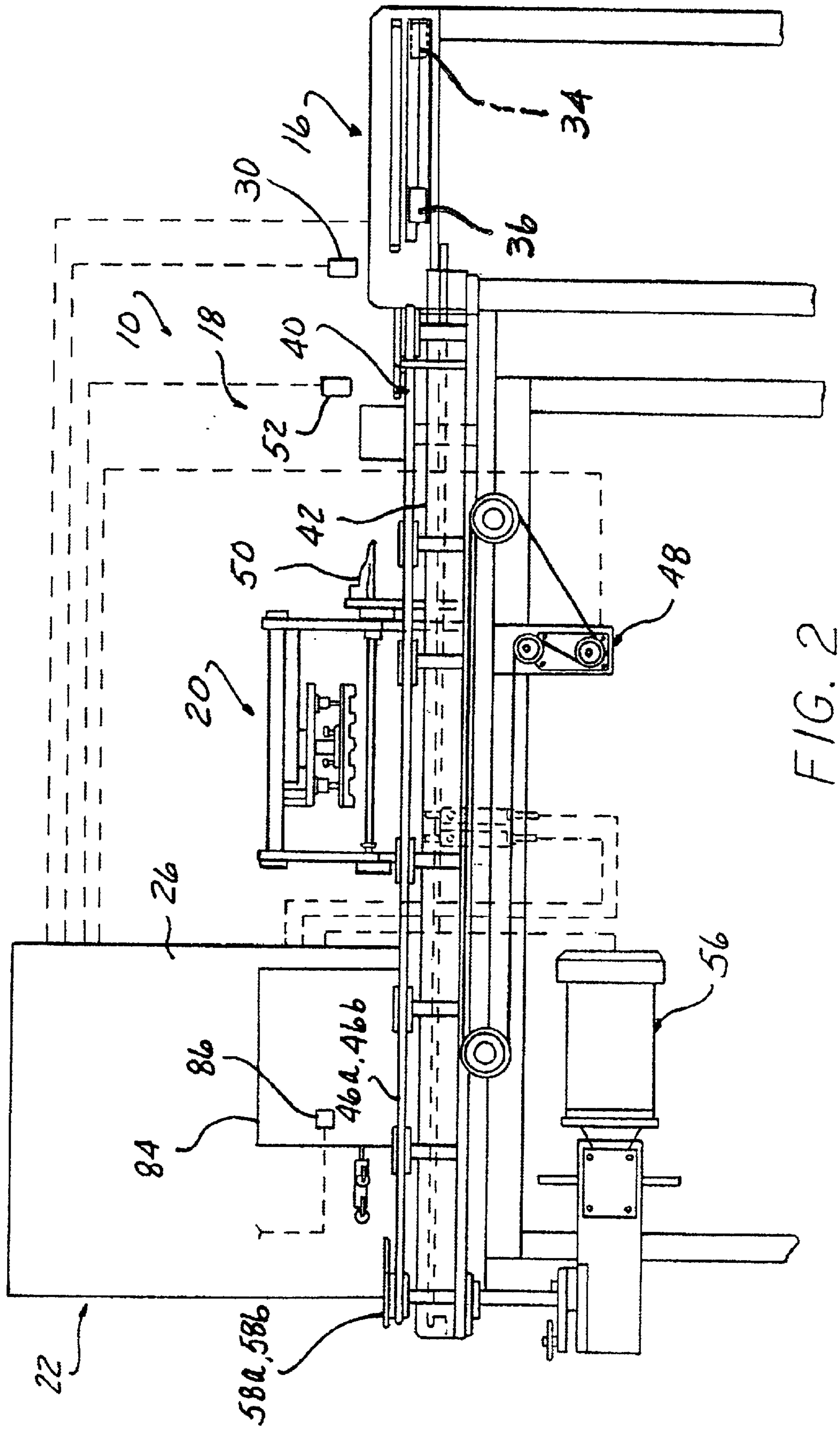
FIG. 2 is a side elevational view of the apparatus depicted in FIG. 1 excluding the unloader mechanism.

Referring now to FIGS. 1 and 2, an apparatus 10 for stamping a plurality of packages or packs 12 positioned within a larger elongate container or carton 14 is illustrated. The apparatus 10 includes a loading station 16, a container or carton opening station 18, a stamping station 20, a closing station 22, and an unloading station 24. Preferably, the apparatus 10 according to the present invention includes a programmable control system 26 for monitoring one or more input signals and for controlling operation of the process in response to the one or more signals as described in greater detail below.

The loading station 16 can include a conveyor 28 for moving a plurality of containers 14 toward a ready position located in proximity to one end of the conveyor 28. When handling cigarette cartons having an elongate configuration along one axis, the cartons 14 are preferably moved along the conveyor 28 in a direction transverse to the longitudinal axis of the carton 14. A sensor 30 is provided in proximity to the ready position for generating an output signal corresponding to the presence of a container 14 at the ready position. In response to the signal generated by the sensor 30, the control system 26 activates a motor 32, such as a fluid operated cylinder to move a pusher arm from a first position 34 to a second position 36 to move the container 14 in the ready position of the loading station 16 along a transport path 38. The control system 26 and sensor 30 allow the loading station 16 to operate on demand when a container or carton 14 is at the ready position of the loading station 16.

A transport conveyor 40 receives the container or carton 14 pushed from the ready position of the loading station 16 by the motor or cylinder 32. The transport conveyor 40 includes an adjustable frame supporting the opening head 50, stamping head 64, and closing applicator elements at the closing station 22. Alternatively, adjustable shelf 42 can be provided to engage the bottom of the container or carton 14 as it moves along the transport path 38. The adjustable shelf can be moved vertically to configure the apparatus 10 according to the present invention for different length cigarette packages 12 positioned within the container or carton 14. The adjustment of the support frame or alternatively shelf 42 is programmed to respond to the operator selection of a particular size cigarette pack to be stamped. Alternatively, the control system 26 can automatically respond to appropriate input signals indicating the size of cartons to be processed and adjusting the elevation of the support frame or alternatively shelf 42 accordingly. By way of example and not limitation, preprogrammed settings can be provided in the control system 26 for regular size cigarettes, king size cigarettes, and ultra long cigarettes, sometimes referred to as 120 lengths. This configuration of the present invention permits the top of the particular container or carton 14 to be properly aligned with a common operational processing plane so that the top of each carton is operably engageable with the other processing elements as the carton travels along the transport path. The elements can include the opening head, the stamping head, and the closing station elements. This configuration permits a single adjustment of the support frame or alternatively shelf 42 without requiring individual adjustments of the various elements along the transport path 38. The transport conveyor 40 preferably includes a plurality of rollers 44 longitudinally spaced from one another on opposite sides of the transport path 38 to support counter rotating belts **46*a*, 46*b* engageable with opposite sides of the container or carton 14 for driving the container or carton 14 along the transport path 38 as the bottom of the container or carton 14 is supported on the adjustable support shelf 42. The programmable control system 26 can control the adjustable support frame or alternatively the shelf elevation 42 by sending an appropriate signal to motor 48 for adjusting the vertical position or elevation of the adjustable support frame or alternatively the shelf 42 for the particular size or dimensions of the containers or cartons 14 to be processed. The counter rotating belts 46*a*, 46*b* engage opposite sides of the container or carton 14 to slide the container or carton 14 along the transport path 38 while supported from beneath by the shelf 42. As the container or carton 14 passes through the opening station 18, an opening head 50 operably engages the upper flaps of the container or carton 14** and folds the flaps to an open position.

One or more sensors 52 can be provided in proximity to the opening station 18 for verifying that the flaps have been moved to the open position and/or determining if a product jam has occurred by improper engagement of the opening head 50 with the container or carton 14. If the flaps have been moved to the open position, the container or carton 14 continues to travel along the transport path 38. If the flaps have not been moved into the open position, an error signal is sent to the control system 26 and operation of the apparatus 10 is temporarily halted for operator intervention to correct the error. If a product jam is sensed at the opening station 18, the transport conveyor 40 is temporarily halted for operator intervention to correct the error. The opposing rollers 44 supporting the counter rotating belts **46*a*, 46*b* can be adjusted toward and away from one another to adapt to different width containers or cartons 14 to be conveyed along the transport path 38. By way of example and not limitation, the programmable control system 26 can be preprogrammed for predefined container or carton dimensions corresponding to regular cigarettes, king size cigarettes, ultra long cigarettes, ultra thin cigarettes, or the like. An appropriate signal can be generated by the control system 26 to activate motor 54 to adjust the distance between opposing rollers 44 in accordance with a control program stored in memory of the control system 26. The control system 26 can control rotation of the counter rotating belts 46*a*, 46*b* by sending an appropriate signal to motor 56. Motor 56 operably drives the counter rotating belts 46*a*, 46*b* through transmission of rotary motion from the motor 56 to the drive rollers 58*a*, 58*b*** respectively.

Figure 3A:
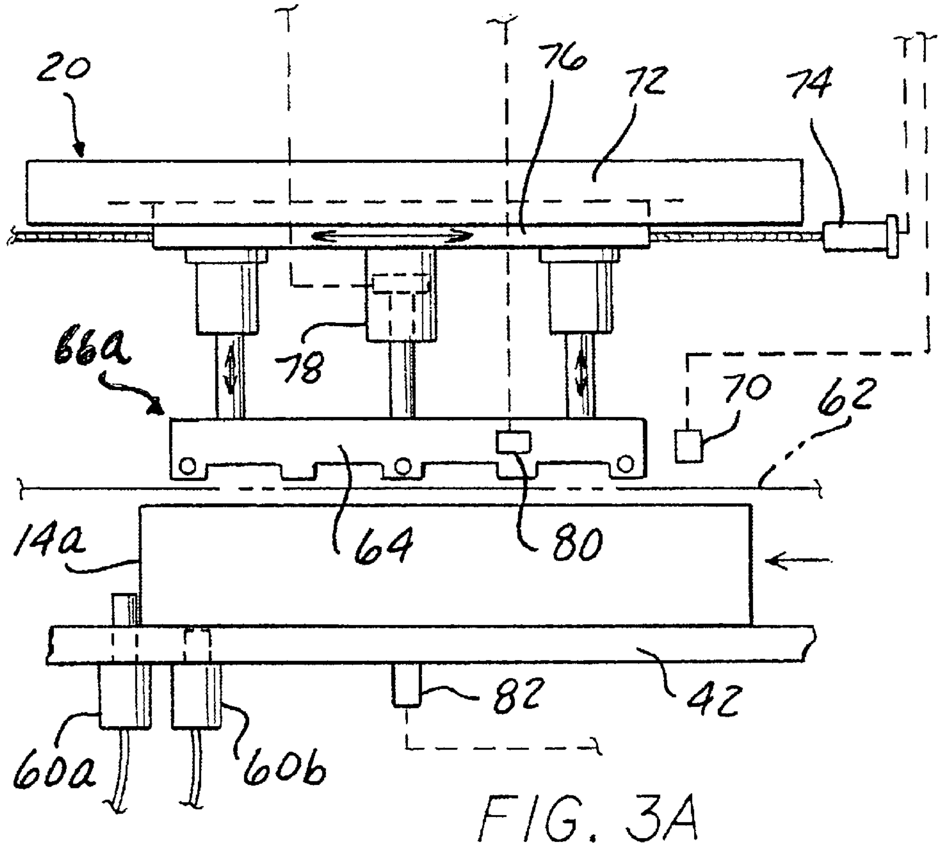
FIG. 3A is a simplified schematic view of a stamping station according to the present invention with a first container held in a first position while the stamping head is reciprocated from a first position.
Figure 3B:
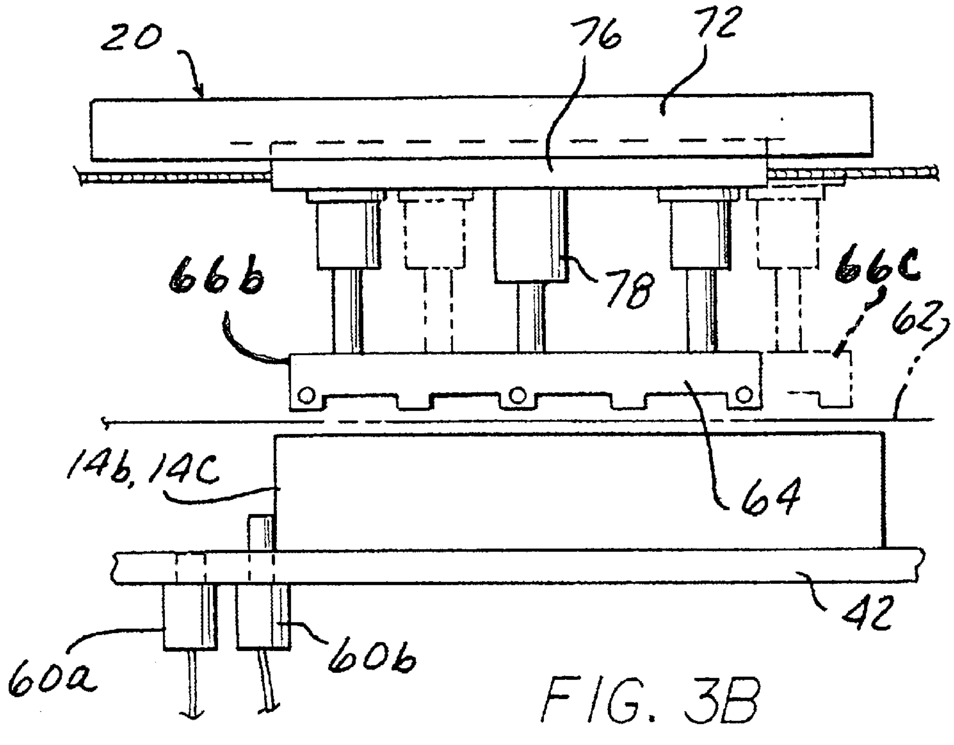
FIG. 3B is a simplified schematic view of the stamping station according to the present invention illustrated in FIG. 2, where a second container is held in a second position and the stamping head is reciprocated from a second position shown in solid line, and where a third container is held in the second position, while the stamping head is reciprocated from a third position shown in phantom lines.

After successfully opening the flaps of the container or carton 14, the container or carton 14 continues along the transport path 38 driven by the transport conveyor 40 to the stamping station 20. Referring now to FIGS. 3A and 3B, one or more stops **60*a*, 60*b* are supported relative to the adjustable support shelf 42 for movement between retracted positions below the upper surface of the support shelf 42 and extended positions obstructing free flow of the container or carton 14 along the transport path 38. By way of example and not limitation, the apparatus 10 according to the present invention will be described in detail with respect to the operation of a stamping operation for applying tax indicia to each of ten packs 12 of cigarettes positioned within a carton 14 and with respect to a carrier film 62 having a plurality of rows of tax indicia, where fifteen tax stamps are located in each row. As the first opened carton 14***a* moves along the transport path 38 and enters the stamping station 20, the first stop 60*a* moves from the normal retracted position to the extended position to hold the first carton 14*a* in a predetermined position with respect to the stamping head 64. The stamping head 64 is movable between a plurality of positions with respect to the transport path 38. By way of example and not limitation, the stamping head 64 can be in a first position 60*a* as illustrated in FIG. 3A for a reciprocal stamping movement between a raised position and a lowered position while the first carton 14*a* is held by the first stop 60*a*. The stamping head 64 can be moved to a second or intermediate position 66*b* shown in solid lines in FIG. 3B for stamping movement between a raised position and a lowered position to stamp a second carton 14*b* conveyed along the transport path 38 and stopped in a second position by movement of the second stop 60*b* from the retracted position to the raised position. The stamping head 64 can also move to a third position 66*c* for reciprocal stamping movement between a raised position and lowered position for stamping a third carton 14*c* as the cartons 14*a*, 14*b*, 14*c* are sequentially moved along the transport path 38. Each reciprocal movement of the stamping head 64 when in the first position 66*a*, second position 66*b*, or third position 66*c*, simultaneously applies ten tax indicia to the corresponding ten packs 12 of cigarettes within the corresponding carton 14*a*, 14*b*, 14*c*.

The tax indicia are applied from two adjacent rows on the carrier film 62. The combination of reciprocating the stamping head 64 when in the first, second, and third positions 66*a*, 66*b*, 66*c* while the carrier sheet or film roll 62 is held stationary applies all of the stamps in the two adjacent rows to the corresponding first, second, and third cartons 14*a*, 14*b*, and 14*c* traveling sequentially down the transport path 38 of the apparatus 10 according to the present invention. When all of the stamps in the two adjacent rows have been applied as described above, a motor 68 is actuated by the control system 26 to index the carrier sheet or film roll 62 of tax indicia by two rows. The motor 68 can include a fluid operated cylinder and ratchet configuration if desired. After each reciprocal stamping operation of the stamping head 64, the appropriate stop 60*a*, or 60*b* is deenergized to return to the retracted position allowing the carton 14*a*, 14*b*, or 14*c*, to continue along the transport path 38. One or more sensors 70 can be provided for monitoring if the carrier sheet of tax indicia has been depleted. The sensor 70 can provide an appropriate signal to the control system 26 to indicate when the carrier sheet or film roll 62 of tax indicia has been depleted, so that the control system 26 can cease operation of the apparatus 10 for operator intervention to replace the depleted carrier sheet or film roll 62 with a new one.

The stamping head 64 can be mounted on one or more rails 72 for movement between the first, second, and third positions 66*a*, 66*b*, 66*c*. A motor 74 can be provided for moving a carriage 76 supported from the one or more rails 72 between the various positions in response to appropriate signals from the control system 26 in accordance with a control program stored in memory. A reciprocal motor 78 can be controlled by the control system 26 in accordance with the control program stored in memory for moving the stamping head 64 between the upper, raised position and the lowered, stamping position.

At least one temperature sensor 80 is preferably provided with respect to the stamping head 64 to monitor the current operating conditions of the stamping head 64. The temperature sensor 80 sends a signal corresponding to the temperature of the stamping head 64 to the control system 26. The control system 26 monitors the signal received from the sensor 80 in accordance with the control program stored in memory. If an abnormal temperature condition is sensed, either a temperature below a predetermined low temperature value, or above a predetermined high temperature value, the control system 26 can temporarily halt operation of the apparatus 10 for operator intervention to correct the error. One or more sensors 82 can be provided in proximity to the stamping station 20 to detect the presence of a container or carton 14 at the stamping station 20. The sensor 82 can provide an appropriate signal to the control system 26 in order to initiate the stamping operation when a carton, such as carton 14*a*, 14*b*, or 14*c*, is present at the stamping station 20. If a carton-present signal is not received from the sensor 82 within a predetermined time period, the control system 26 can provide an audible and/or visual signal indicating a malfunction requiring operator attention. It should be recognized that the sequential stamping operations can be modified corresponding to the number of stamps carried by the carrier sheet 62, the number of stamps applied with each reciprocal stamping stroke, and the size of the packages to receive the stamps without departing from the spirit and scope of the present invention.

Referring again to FIGS. 1 and 2, after each package 12 positioned within the container 14 has been stamped with the appropriate indicia at the stamping station 20, the container 14 continues along the transport path 38 driven by the transport conveyor 40 to the closing station 22. As the container 14 passes through the closing station 22, hot glue or adhesive is applied to at least one of the open flaps and the flaps are brought into engagement with one another for resealing or closing the container 14. A hot glue or adhesive receptacle 84 is provided in proximity to the closing station 22. A temperature sensor 86 is provided in association with the receptacle 84 to monitor the temperature of the hot glue or adhesive to be applied. The temperature sensor 86 generates an appropriate signal corresponding to the current temperature of the hot glue or adhesive. The temperature signal from the sensor 86 is received by the control system 26. The control system 26 monitors the temperature of the hot glue or adhesive according to a control program stored in memory. If the hot glue or adhesive temperature falls below a predetermined low temperature value, or rises above a predetermined high temperature value, the control system 26 can temporarily halt operation of the apparatus 10 for operator intervention to correct the error. The hot glue or adhesive 84 is applied to at least one of the open flaps through applicator nozzle 88 incorporating an on/off valve function. The control system 26 can control the application of the hot glue or adhesive through the applicator nozzle 88 in response to a signal generated by one or more sensors 90 indicating that a container or carton 14 is passing under the applicator nozzle 88. After application of the hot glue or adhesive to at least one of the open flaps of the container or carton 14, the flaps are brought into engagement with one another and pressure is applied by one or more rollers 92 to allow the adhesive to set. Other types of adhesives, such as cold adhesives can be used in the presnet invention if desired. The resealed container 14 is then discharged to the unloading station 24 at the end of the transport path 38.

The discharged container 14 is received by the unloading station 24. Preferably, the unloading station 24 includes a conveyor 94 for conveying and accumulating a predetermined number of resealed containers 14. A sensor 96 can be positioned in proximity to the unloading station 24 for monitoring the accumulation of the resealed containers 14 on the conveyor 94. If an excessive accumulation of resealed containers 14 occurs on the conveyor 94, an appropriate signal can be generated by sensor 96 to the control system 26 in order to temporarily halt operation of the apparatus 10 until the excessive accumulation condition is corrected.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for stamping indicia on a plurality of packages positioned within an opened container comprising:

an adjustable transport conveyor for moving a plurality of containers sequentially along a transport path through an opening station, a stamping station, and a closing station, the entire transport path extending between first and second counter rotating conveyor belts operably engaging opposite sides of each container to be transported for imparting motion thereto;

a reciprocal stamping head moveable between a first position spaced from a container positionable at the stamping station and a second position operably engageable simultaneously with the plurality of packages to be stamped positioned within the container; and a carrier sheet supporting indicia to be applied to the packages interposed between the packages to be stamped and the stamping head, the indicia applied to the packages in response to operable engagement between the reciprocal stamping head and the packages to be stamped.

2. The apparatus of claim 1 wherein the transport conveyor further comprises:

an adjustable support frame for supporting the stamping head to accommodate containers of different sizes to be transported along the transport path, the support frame adjustably moveable vertically to maintain a single common operational processing plane corresponding to an upper surface of each container to be transported along the transport path.

3. The apparatus of claim 1 wherein the transport conveyor further comprises:

a plurality of rollers longitudinally spaced from one another along both sides of the transport path for supporting first and second conveyor belts for counter rotating movement on opposite sides of the transport path, such that the first and second belts are operably engageable with opposite sides of the container to be transported for driving the container along the transport path.

4. The apparatus of claim 1 further comprising:

at least one stop moveable between an extended position for obstructing passage of a container through the stamping station and a retracted position allowing passage of the container through the stamping station.

5. The apparatus of claim 1 further comprising:

at least one rail extending parallel with the transport path;

a carriage connected to the stamping head, the carriage supported from the at least one rail for movement between a plurality of positions with respect to the transport path; and a drive for moving the carriage between the plurality of positions.

6. The apparatus of claim 1 further comprising:

a central processing unit for receiving at least one signal to be processed in accordance with a control program stored in memory.

7. The apparatus of claim 6 wherein the at least one signal is generated by at least one sensor selected from a group consisting of a temperature sensor and a proximity sensor.

8. The apparatus of claim 1 further comprising:

a container opening station positioned upstream of the stamping station along the transport path, the opening station operably engageable with each container traveling along the transport path to fold open overlapping flaps enclosing the packages to be stamped with the container prior to delivery to the stamping station.

9. The apparatus of claim 1 further comprising:

a loading station positioned upstream of the stamping station with respect to the transport path, the loading station for receiving a plurality of containers in a predetermined orientation, for conveying the containers in a first direction to individually occupy a ready position, and for pushing the individual container from the ready position to operably engage the transport conveyor.

10. The apparatus of claim 1 further comprising:

a closing station positioned downstream of the stamping station with respect to the transport path, the closing station operably engageable with each container traveling along the transport path to apply adhesive to at least one flap of a container to be sealed and to fold overlapping flaps into engagement with respect to one another for enclosing the stamped packages received from the stamping station.

11. The apparatus of claim 1 further comprising:

an unloading station positioned downstream of the stamping station with respect to the transport path, the unloading station operably receiving a plurality of containers with stamped packages from the stamping station.

12. The apparatus of claim 1 further comprising:

a first stop and a second stop extendable vertically to engage a lower portion of each container traveling along the transport path, the first stop located further downstream along the transport path than the second stop, each stop independently moveable between an extended position for obstructing passage of a container through the stamping station and a retracted position allowing passage of the container through the stamping station, where the operation of the first and second stops is coordinated with the reciprocal stamping head for placing the indicia closer to centered with respect to the package to be stamped.

13. A method for stamping indicia on a plurality of packages positioned within an opened container comprising the steps of:

conveying a plurality of containers sequentially along a transport path through an opening station, a stamping station, and a closing station, the entire transport path extending between first and second counter rotating conveyor belts operably engaging opposite sides of each container to be transported for imparting motion thereto with an adjustable transport conveyor;

reciprocating a stamping head between a first position spaced from a container positionable at the stamping station and a second position operably engageable simultaneously with the plurality of packages to be stamped positioned within the container; and applying indicia supported on a carrier sheet interposed between the packages to be stamped and the stamping head in response to operable engagement between the reciprocal stamping head and the packages to be stamped.

14. The method of claim 13 wherein the conveying step further comprises the step of:

supporting the stamping head to accommodate containers of different sizes to be transported along the transport path with an adjustable support frame, the support frame adjustably moveable vertically to maintain a single common operational processing plane corresponding to an upper surface of each container to be transported along the transport path.

15. The method of claim 13 wherein the conveying step further comprises the step of:

counter rotating first and second conveyor belts supported by a plurality of rollers longitudinally spaced from one another along both sides of the transport path, such that the first and second belts are operably engageable with opposite sides of the container to be transported for driving the container along the transport path.

16. The method of claim 13 further comprising the step of:

moving at least one stop between an extended position for obstructing passage of a container through the stamping station and a retracted position allowing passage of the container through the stamping station.

17. The method of claim 13 further comprising the steps of:

moving a carriage connected to the stamping head along at least one rail extending parallel with the transport path, the carriage supported from the at least one rail for movement between a plurality of positions with respect to the transport path; and moving the carriage between the plurality of positions with a drive.

18. The method of claim 13 further comprising the step of:

receiving at least one signal to be processed in accordance with a control program stored in memory with a central processing unit.

19. The method of claim 18 wherein the at least one signal is generated by at least one sensor selected from a group consisting of a temperature sensor and a proximity sensor.

20. The method of claim 13 further comprising the step of:

opening each container traveling along the transport path at a container opening station positioned upstream of the stamping station, the opening station operably engageable with each container traveling along the transport path to fold open overlapping flaps enclosing the packages to be stamped with the container prior to delivery to the stamping station.

21. The method of claim 13 further comprising the step of:

receiving a plurality of containers in a predetermined orientation at a loading station positioned upstream of the stamping station with respect to the transport path, the loading station for conveying the containers in a first direction to individually occupy a ready position, and for pushing the individual container from the ready position to operably engage the transport conveyor.

22. The method of claim 13 further comprising the step of:

applying adhesive to at least one flap of a container to be sealed at a closing station positioned downstream of the stamping station with respect to the transport path, the closing station operably engageable with each container traveling along the transport path to fold overlapping flaps into engagement with respect to one another for enclosing the stamped packages received from the stamping station.

23. The method of claim 13 further comprising the step of:

operably receiving a plurality of containers with stamped packages from the stamping station at an unloading station positioned downstream of the stamping station with respect to the transport path.

24. The apparatus of claim 1 further comprising:

a pusher arm separate from the transport conveyor for moving each individual container into engagement with the opposing counter rotating belts of the transport conveyor.

25. The apparatus of claim 1 further comprising:

a programmable control system responsive to operator selection of a particular size pack to be stamped for automatically adjusting operating parameters to accommodate the particular size pack selected.

26. The method of claim 13 further comprising the step of:

moving each individual container into engagement with the opposing counter rotating belts of the transport conveyor with a pusher arm separate from the transport conveyor.

27. The method of claim 13 further comprising the step of:

automatically adjusting operating parameters to accommodate a particular size pack selected a programmable control system responsive to operator selection of the particular size pack to be stamped.

28. The method of claim 13 further comprising the step of:

obstructing passage of a container through the stamping station with a first stop and a second stop extendable vertically to engage a lower portion of each container traveling along the transport path, the first stop located further downstream along the transport path than the second stop, each stop independently moveable between an extended position obstructing passage of a container and a retracted position allowing passage of the container through the stamping station, where the operation of the first and second stops is coordinated with the reciprocal stamping head for placing the indicia closer to centered with respect to the package to be stamped.

29. An apparatus for stamping indicia on a plurality of packages positioned within an opened container comprising:

an adjustable transport conveyor for moving a plurality of containers sequentially along a transport path through an opening station, a stamping station, and a closing station, the entire transport path extending between first and second counter rotating conveyor belts operably engaging opposite sides of each container to be transported for imparting motion thereto;

a reciprocal stamping head moveable between a first position spaced from a container positionable at the stamping station and a second position operably engageable simultaneously with the plurality of packages to be stamped positioned within the container;

a carrier sheet supporting indicia to be applied to the packages interposed between the packages to be stamped and the stamping head, the indicia applied to the packages in response to operable engagement between the reciprocal stamping head and the packages to be stamped;

an adjustable support frame for supporting the stamping head to accommodate containers of different sizes to be transported along the transport path, the support frame adjustably moveable vertically to maintain a single common operational processing plane corresponding to an upper surface of each container to be transported along the transport path; and at least one stop moveable between an extended position for obstructing passage of a container through the stamping station and a retracted position allowing passage of the container through the stamping station.

30. A method for stamping indicia on a plurality of packages positioned within an opened container comprising the steps of:

moving, a plurality of containers sequentially along a transport path through an opening station, a stamping station, and a closing station, the entire transport path extending between first and second counter rotating conveyor belts operably engaging opposite sides of each container to be transported for imparting motion thereto with an adjustable transport conveyor;

moving a reciprocal stamping head between a first position spaced from a container positionable at the stamping station and a second position operably engageable simultaneously with the plurality of packages to be stamped positioned within the container;

supporting indicia to be applied to the packages on a carrier sheet, the carrier sheet interposed between the packages to be stamped and the stamping head, the indicia applied to the packages in response to operable engagement between the reciprocal stamping head and the packages to be stamped;

supporting the stamping head to accommodate containers of different sizes to be transported along the transport path with an adjustable support frame, the support frame adjustably moveable vertically to maintain a single common operational processing plane corresponding to an upper surface of each container to be transported along the transport path; and obstructing passage of a container through the stamping station with at least one stop moveable between an extended position and a retracted position allowing passage of the container through the stamping station.

* * * * *